(No Model.) 6 Sheets—Sheet 4.
G. LINES & A. BRIDGMAN.
BOX NAILING MACHINE.
No. 318,918. Patented May 26, 1885.
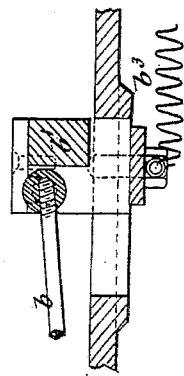
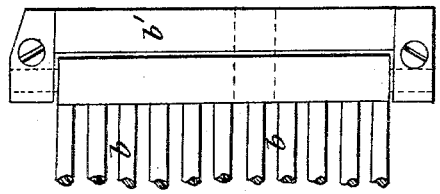
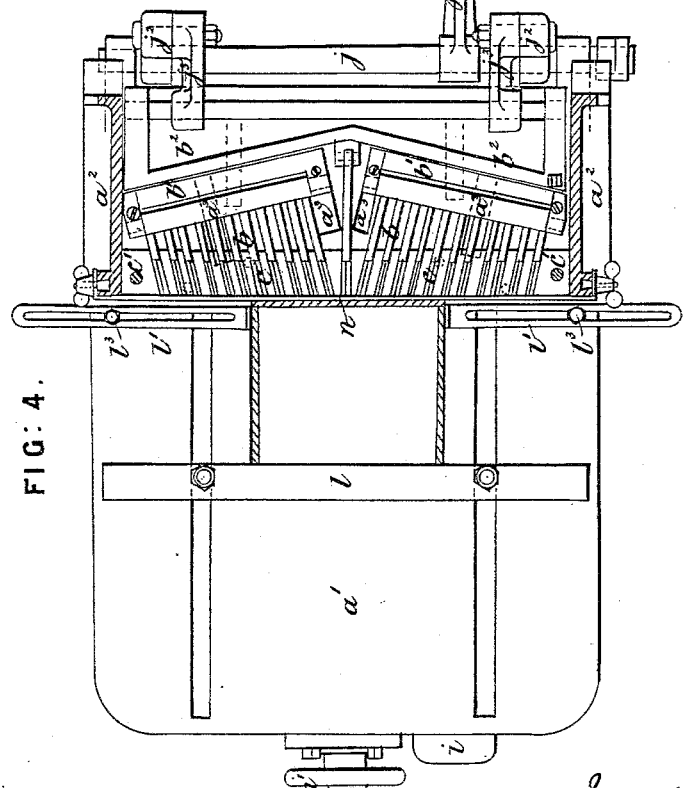

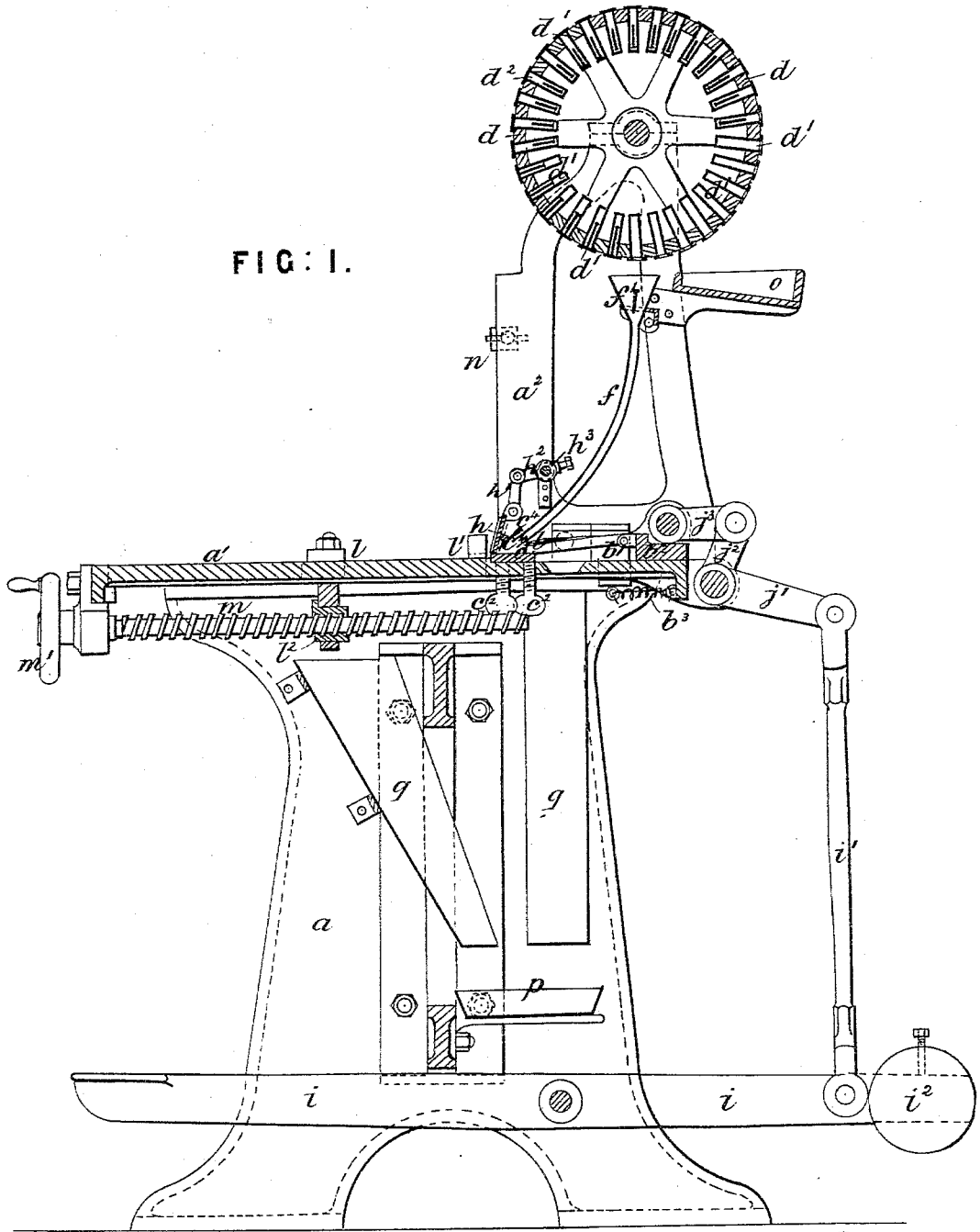

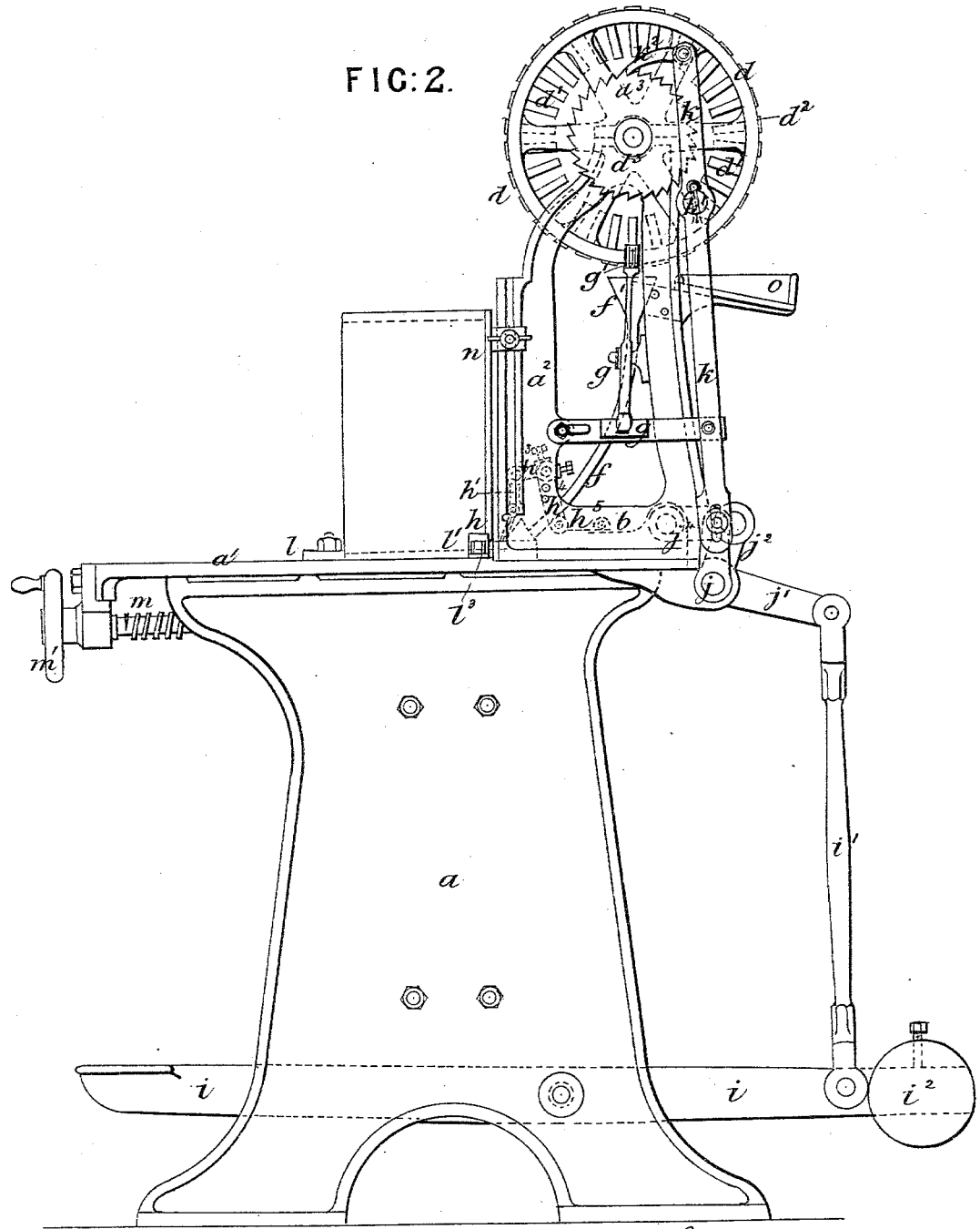

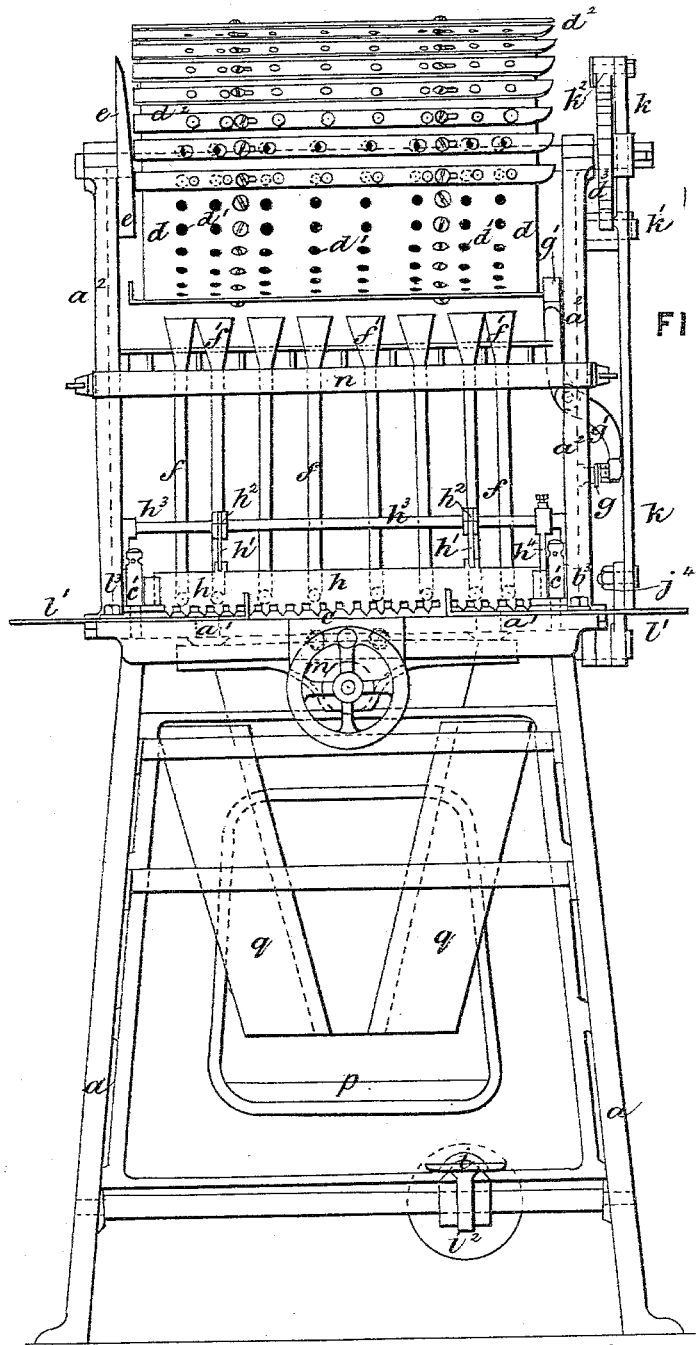

(No Model.) 6 Sheets—Sheet 5.
G. LINES & A. BRIDGMAN.
BOX NAILING MACHINE.
No. 318,918. Patented May 26, 1885.
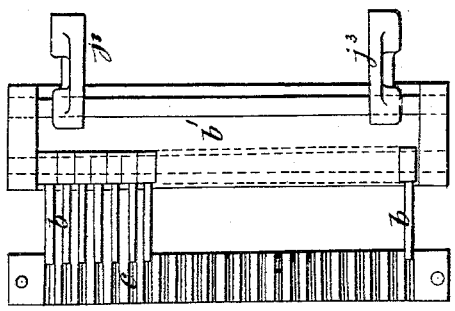
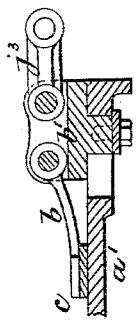
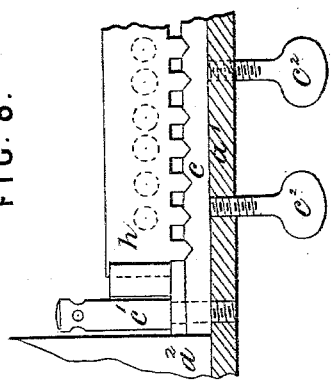
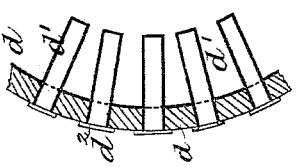
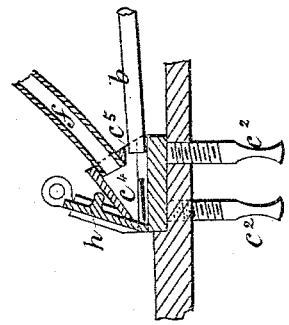
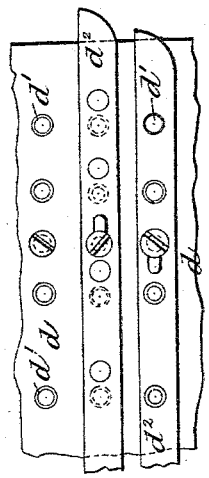
Witnesses:
Edward Steer
Geo. L. Wheelock
Inventors,
George Lines and Alfred Bridgman,
By Knight Bros
their Attys

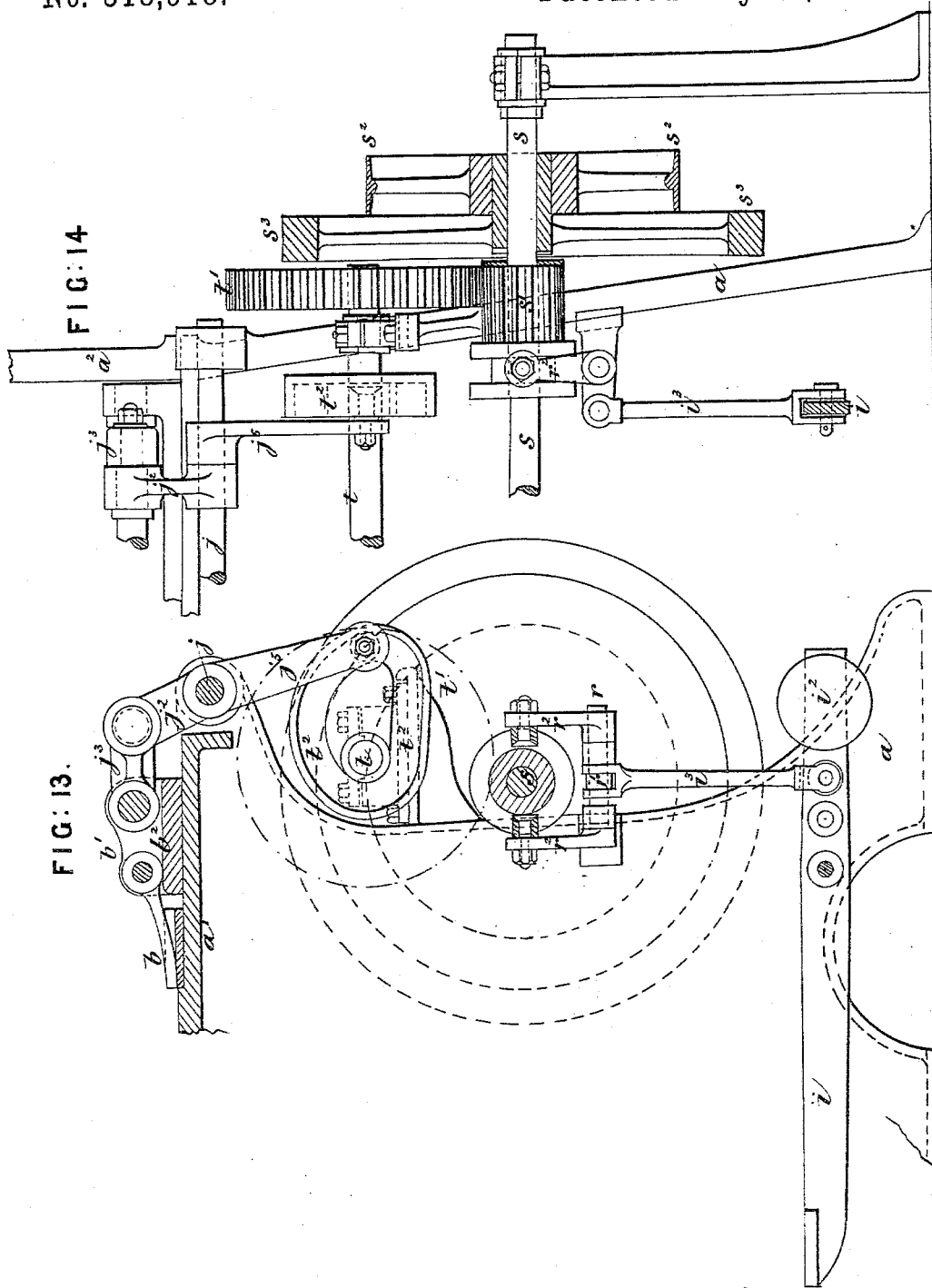

UNITED STATES PATENT OFFICE.

GEORGE LINES, OF HOLLOWAY, AND ALFRED BRIDGMAN, OF STOKE-NEWINGTON, COUNTY OF MIDDLESEX, ENGLAND.

BOX-NAILING MACHINE.

SPECIFICATION forming part of Letters Patent No. 318,918, dated May 26, 1885.

Application filed October 14, 1884. (No model.)

*To all whom it may concern:*

Be it known that we, GEORGE LINES, of 63 Crayford Road, Holloway, engineer, and ALFRED BRIDGMAN, of Stoke-Newington, box-maker, both in the county of Middlesex, England, subjects of the Queen of Great Britain, have invented certain new and useful Improvements in Nailing-Machines Employed in the Manufacture of Packing Cases and Boxes, and of which the following is a specification.

This invention has for its object an improved construction, arrangement, and combination of parts, whereby a simple, cheap, and efficient box-nailing machine is produced; and our invention relates to that class of machine in which the nails are driven into the wood in a horizontal direction.

Our invention is represented in the accompanying drawings, of which Figure 1 is a vertical longitudinal section. Fig. 2 is a side view. Fig. 3 is a front view, and Fig. 4 is a plan with the feeding arrangements removed; and Figs. 5, 6, 7, 8, 9, and 10, are detail views of parts drawn to a larger scale, and Figs. 11 and 12 are detail views representing a slight modification.

The machine shown in the above figures is arranged to be driven by a treadle; but in Figs. 13 and 14 we have represented an arrangement of parts which we employ when driving the machine by power, the machine being thrown into and out of action by means of a treadle. We support the wood on a stationary table or platform, $a'$, carried by standards $a$, and force the nails into the wood by means of movable pushers or drivers $b$, acting upon the nails, as hereinafter described. We also, according to our invention, arrange the nail-guides $c$ in such directions that those on each side of the center nail point either inward, as shown in the drawings, or outward, the center nail-guide being at right angles to the surface of the wood, by which means the nails, except the center one, are driven in slanting directions into the wood, and thereby obtain a firmer hold than when driven at right angles into the same.

The nails are fed to the nail-guides $c$ in the following manner: A horizontal cylinder, $d$, is formed with a series of holes or sockets, $d'$, arranged in rows extending across in a direction from end to end thereof and placed at suitable distances apart from each other. An attendant supplies these holes or sockets $d'$ with nails, which are placed with their heads first or downward therein. In a line with each row of holes or sockets $d'$ we arrange a sliding perforated bar, $d^2$, the perforations of which when in one position are coincident with the corresponding row of holes or sockets, $d'$, in the cylinder $d$, so as to permit the nails to be fed to such holes or sockets $d'$. After the nails have been fed as above described, the attendant pushes said sliding perforated bar $d^2$ endwise so as to cause the solid parts thereof to cover its corresponding row of holes or sockets, $d'$, in the cylinder $d$. This sliding of the perforated bar $d^2$ by the attendant is done in order to indicate to him which rows of holes or sockets $d'$ he has fed with nails, and thereby prevent his feeding more than one nail to each hole or socket $d'$ for each revolution of the cylinder $d$. In the rotation of the cylinder $d$ these sliding bars $d^2$ are caused to pass a fixed cam, $e$, carried by one of the standards $a^2$, which cam $e$ in the event of the attendant having omitted to slide any of such bars $d^2$, as above described, will automatically cause the sliding thereof, so as to insure all the holes or sockets $d'$ being covered before they come to the lower part of the cylinder $d$. Then in order to release the nails from the holes or sockets $d'$ as they arrive over the funnels or mouths $f'$, connected by tubes $f$ to the nail-guides $c$, such sliding covering-bars $d^2$ are, by means of a sliding cam, $g$, acting upon a lever, $g'$, moved endwise until the holes therein again coincide with the holes or sockets $d'$ in the cylinder $d$, thereby permitting the nails to fall into the aforesaid funnels or mouths $f'$. The nail-guides are formed of a bottom grooved plate, $c$, which is adjustable by screws $c'\ c^2$, both as to height and inclination in respect to the table or platform $a'$ of the machine in order to adjust the parts to different thicknesses of wood and to the angles to which it is required to drive the nails into the wood, while by such means nails with either large or small heads can be used, as by tilting the plate $c$ a large-headed nail can be presented to the wood in a direction parallel to its faces, or in a direction slightly inclined thereto. Over this grooved plate $c$ is fixed a series of guides, $c^4$, to which the tubes $f$ are fixed. These guides $c^4$, below their junction with the tubes $f$, are open at their under sides to permit of the falling of the nails into the grooves of the bottom guide-plate, $c$, and they are also formed with openings $c^5$ (see Fig. 7) for the passage therethrough of the nail pushers or drivers $b$, while along the front of the nail-guides we mount a guard-plate, $h$, which, when the nail pushers or drivers $b$ are in their retracted position, stands with its toothed edge resting in the grooves of the bottom guide-plate, $c$, and thereby prevents the nails from falling or jumping out of their guide-grooves, and there remains until the pushers or drivers $b$ begin to advance, at which time it is, as hereinafter described, automatically lifted, after which the said plate $h$ is again lowered on the retirement of the pushers or drivers $b$. We arrange the several grooves of the plate $c$ and the guides $c'$ at short distances apart, so that the tubes $f$ can be connected with such nail-guides as for the time being may be required for use, and by supplying nails to all the sockets $d'$ in each row of the cylinder $d$, or to any desired number and arrangement of such sockets $d'$, the machine can be readily adjusted to various varieties of work. The nail pushers or drivers $b$ are fixed to or carried by bars $b'$, which are guided to move in the paths required for driving the nails in the directions hereinbefore described by projections therefrom passing into inclined guide-slots $a^3$, formed in the table or platform $a'$, and such bars $b'$ are acted upon by another bar, $b^2$, formed with a broad ⌄⌃ face, or it might be a reversed ⌃⌄, to which motion is given to force the nails into the work by means of a treadle, $i$, which, by a link or connecting-rod, $i'$, is connected to a lever, $j'$, fixed on a shaft or axis, $j$, on which are also fixed levers $j^2$, which, by links $j^3$, are connected with the bar $b^2$. Springs $b^3$ effect the return motion of the bar $b'$. If desired, rollers may be placed between the bar $b^2$ and the bar $b'$ to reduce friction. The shaft or axis $j$ has also fixed thereon a lever, $j^4$, which acts upon the lower end of a lever, $k$, mounted on axis of motion $k'$, and the upper end of which, by means of a pawl, $k^2$, acting upon a ratchet-wheel, $d^3$, fixed on the axis of the feeding-cylinder $d$, gives a step-by-step rotary motion to the said cylinder $d$. The said lever $k$ has also connected thereto the sliding cam $g$, and thereby operates the same at the required times. The guard-plate $h$ is suspended by links $h'$ from levers $h^2$, fixed to a cross-shaft, $h^3$, on which is also fixed a lever, $h^4$, which, by a link, $h^5$, is connected to the sliding bar $b^2$, by which means the said guard-plate $h$ is raised and lowered at the required times. The table or platform $a'$ for the work is provided with movable fences or guides $l\,l'$ at right angles to each other, the guide $l$ being adjusted by means of a worm or screw, $m$, working in a nut, $l^2$, and operated by a hand-wheel, $m'$, while the other guides or fences $l'$ are adjusted by means of thumb-screws or by bolts and nuts $l^3$, as shown. A counterbalance-weight, $i^2$, is employed to produce the return motion of the treadle $i$; or a spring or springs may be employed for such purpose.

Instead of driving the nails in angular directions, as hereinbefore described, the machine may be arranged to drive the nails, as heretofore, at right angles to the work, in which case the sliding bar $b'$, carrying the nail pushers or drivers $b$, is connected, as shown at Figs. 11 and 12, directly to the links $j^3$, by which it is operated. The horizontal portion of the box or case lying upon the table or platform $a'$ is adjusted by the attendant to the fences $l\,l'$, which are previously fixed at the desired places. The upright part of the work is at its lower part placed against the horizontal part and against the front of the nail-guides $c$, and in order that it may be held at right angles to such horizontal part a guide-bar, $n$, is fixed at a suitable distance above the table or platform $a'$ in such position that when the vertical part of the work is pressed against the same it shall be held, as required, at right angles to the horizontal part. We also fix a tray, $o$, in convenient position to hold a supply of nails for the attendant to feed to the feeding-cylinder $d$, and we fix another tray, $p$, and suitable guides, $q$, under the table or platform $a'$ to receive any nails which may be dropped in the working of the machine.

By the arrangement of feeding and guiding mechanism herein described any description of nail may be employed. The machine may also be driven by power, in which case we employ the arrangement shown at Figs. 13 and 14 to throw the machine into action at the required times. In such arrangement the treadle $i$ is connected by a link, $i^3$, to a lever, $r'$, fixed on an axis, $r$, to which latter are fixed clutch-levers $r^2$, which act to move the pinion $s'$ longitudinally on the driving-shaft $s$, which latter receives motion by a strap or band from any suitable motive power acting upon the pulley $s^2$. The pinion $s'$ is formed on its end with a clutch to act in connection with a corresponding clutch formed on the boss of the fly-wheel $s^3$. Thus when in the position shown in the drawings the shaft $s$ is capable of rotation independently of the pinion $s'$, but when the said pinion is moved on the shaft $s$ so that its clutch acts in connection with the clutch on the fly-wheel $s^3$ motion will be communicated to the pinion $s'$ which in its turn will communicate motion to the toothed wheel $t'$, fixed on the shaft or axle $t$. On this shaft $t$ is also fixed a cam, $t^2$, which acts upon a lever, $j^5$, fixed upon the shaft or axle $j$, and thus communicates a rocking motion to said shaft $j$, which, through the several levers fixed thereon, as described, with respect to Figs. 1 to 12, communicates motion to the various parts of the machine. Thus by depressing the treadle $i$ the machine is thrown into gear with the driving-shaft $s$, while by releasing the treadle $i$ the weight $i^2$ on the rear end thereof acts thereon to throw the pinion $s'$ out of connection with the driving-pulley $s^2$, and thereby stops the machine.

Having thus described the nature of our said invention and the mode in which we carry the same into effect, we would have it understood that what we claim is—

1. In a nailing-machine, a horizontal cylinder having separate nail-sockets for each nail, in combination with nail-feeding tubes.

2. A horizontal cylinder having nail holes or sockets, and sliding perforated bars for opening or closing the holes or sockets, as set forth.

3. The combination, with the horizontal cylinder having nail holes or sockets and perforated sliding-bars, of the fixed cam to close the nail holes or sockets and a lever and sliding cam to open the nail holes or sockets, as set forth.

4. The combination of the horizontal cylinders $d$, having nail holes or sockets $d'$ and sliding perforated bars $d^2$, a fixed cam, $e$, to act upon the bars at one end, a lever, $g'$, to act upon the bars at the other end, a cam to operate the lever, and feeding funnels or tubes, as set forth.

5. The combination of the bed or table, a grooved nail-plate, and screws working through the bed or table and bearing upon the under side of the nail-plate, for adjusting the latter as to height and inclination.

6. The combination, with the stationary feeding-tubes, guides, and grooved plate, of the guard-plate having toothed edge fitting in the grooved plate and adapted to be elevated, as set forth.

7. The combination of guard-plate $h$, cross-shaft $h^3$, levers $h^2$, fixed to the cross-shaft, links $h'$, by which the guard-plate is suspended on the levers, and devices, substantially as described, by which the shaft is connected to the pusher-bar, as set forth.

8. The combination of the nail-cylinder, ratchet-wheel fixed to the axis thereof, levers $j'$, shaft $j^2$, lever $k$, axis $k'$, and pawl $k^2$, secured to the lever $k$ to adjust the cylinder, as set forth.

9. The combination of the cylinder having sockets, and bars to slide over the sockets, the levers $j'$ and $k$, the shaft $j$ and axis $k'$, for said levers, the sliding cam-bar $g$, connected to the lever $k$, and the lever $g'$, between the cam-sliding bars, as set forth.

10. The combination of the table having inclined guide-slots $a^3$, the nail-plate $c$, having the angularly or radially arranged grooves or guides, the bars $b'$, carrying angularly or radially arranged pushers or drivers $b$, and having projections working in the guide-slots, the bar $b^2$, devices by which the bar $b^2$ is caused to advance the pusher or driver bars, and devices for retracting the latter, substantially as set forth.

GEORGE LINES.
ALFRED BRIDGMAN.

Witnesses:
C. M. WHITE,
C. R. MILLS.

*Both of 23 Southampton Buildings, London.*